United States Patent
Schumacher et al.

(10) Patent No.: US 9,747,116 B2
(45) Date of Patent: Aug. 29, 2017

(54) IDENTIFYING MEMORY OF A BLADE DEVICE FOR USE BY AN OPERATING SYSTEM OF A PARTITION INCLUDING THE BLADE DEVICE

(71) Applicant: Hewlett-Packard Development Company, L.P., Houston, TX (US)

(72) Inventors: Derek Schumacher, Auburn, CA (US); Sylvia K Myer, Fort Collins, CO (US); Russ W Herrell, Fort Collins, CO (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 155 days.

(21) Appl. No.: 14/781,022

(22) PCT Filed: Mar. 28, 2013

(86) PCT No.: PCT/US2013/034236
§ 371 (c)(1),
(2) Date: Sep. 28, 2015

(87) PCT Pub. No.: WO2014/158153
PCT Pub. Date: Oct. 2, 2014

(65) Prior Publication Data
US 2016/0055012 A1    Feb. 25, 2016

(51) Int. Cl.
*G06F 9/00* (2006.01)
*G06F 9/445* (2006.01)
(Continued)

(52) U.S. Cl.
CPC ........ *G06F 9/44505* (2013.01); *G06F 9/4406* (2013.01); *G06F 9/5016* (2013.01); *G06F 9/5077* (2013.01)

(58) Field of Classification Search
CPC ...... G06F 9/44505; G06F 8/65; G06F 9/4401; G06F 15/7867; G06F 9/5016; G06F 9/4406; G06F 9/5077
See application file for complete search history.

(56) References Cited

U.S. PATENT DOCUMENTS 6,094,699 A    7/2000   Surugucchi
6,199,107 B1   3/2001   Dujari
(Continued)

FOREIGN PATENT DOCUMENTS

CN    1655519 A    8/2005
CN    101371224   2/2009
(Continued)

OTHER PUBLICATIONS

Brey et al., "BladeCenter chassis management," Nov. 2005, IBM J. Res. & Dev. vol. 49, No. 6, 21 Pgs.
(Continued)

*Primary Examiner* — Zahid Choudhury
(74) *Attorney, Agent, or Firm* — Hewlett Packard Enterprise Patent Department

(57) ABSTRACT

Examples disclosed herein relate to identifying memory of a blade device for use by an operating system (OS) of a partition including the blade device. Examples include identifying memory of a first blade device associated with a first logical processor of the first blade device for use by an OS of a partition including the first blade device and a second blade device, wherein the OS is executed by at least a second logical processor of the second blade device.

15 Claims, 4 Drawing Sheets

(51) Int. Cl.
*G06F 9/50* (2006.01)
*G06F 9/44* (2006.01)

(56) References Cited

U.S. PATENT DOCUMENTS

| | | | |
|---|---|---|---|
| 6,279,085 B1 | 8/2001 | Carpenter et al. | |
| 6,418,525 B1 | 7/2002 | Charney | |
| 6,453,344 B1 | 9/2002 | Ellsworth et al. | |
| 6,684,343 B1 | 1/2004 | Bouchier et al. | |
| 6,988,169 B2 | 1/2006 | Burger et al. | |
| 7,064,376 B2 | 6/2006 | Shau | |
| 7,096,469 B1 | 8/2006 | Kubala et al. | |
| 7,222,339 B2 | 5/2007 | Rothman et al. | |
| 7,353,375 B2* | 4/2008 | Cepulis | G06F 21/10 713/1 |
| 7,383,461 B2 | 6/2008 | Buckler et al. | |
| 7,441,066 B2* | 10/2008 | Bouchier | G06F 15/177 710/301 |
| 7,474,623 B2 | 1/2009 | Boyd et al. | |
| 7,480,747 B2 | 1/2009 | Bell et al. | |
| 7,603,516 B2 | 10/2009 | Allen | |
| 7,694,298 B2 | 4/2010 | Goud et al. | |
| 7,752,495 B2 | 7/2010 | Zorek, Sr. et al. | |
| 7,814,366 B2 | 10/2010 | Apparao et al. | |
| 7,921,179 B1 | 4/2011 | Zheng et al. | |
| 8,090,932 B1 | 1/2012 | Kwan | |
| 8,140,871 B2 | 3/2012 | Abdul et al. | |
| 8,151,147 B2 | 4/2012 | Rajkumari et al. | |
| 8,180,996 B2 | 5/2012 | Fullerton et al. | |
| 8,230,145 B2 | 7/2012 | Bresniker | |
| 8,352,710 B2* | 1/2013 | Bell, Jr. | G06F 9/5088 710/5 |
| 8,788,750 B2 | 7/2014 | Jacobson et al. | |
| 2001/0013089 A1 | 8/2001 | Weber | |
| 2002/0052914 A1 | 5/2002 | Zalewski et al. | |
| 2002/0099886 A1 | 7/2002 | Emerson et al. | |
| 2004/0024831 A1 | 2/2004 | Yang et al. | |
| 2004/0139368 A1 | 7/2004 | Austen et al. | |
| 2004/0186688 A1* | 9/2004 | Nejedlo | G06F 11/27 702/186 |
| 2004/0255286 A1 | 12/2004 | Rothman | |
| 2005/0015430 A1 | 1/2005 | Rothman et al. | |
| 2005/0021847 A1 | 1/2005 | Rothman et al. | |
| 2005/0026486 A1* | 2/2005 | Thomas | G06F 9/4413 439/188 |
| 2005/0060531 A1 | 3/2005 | Davis et al. | |
| 2005/0172164 A1 | 8/2005 | Fox et al. | |
| 2005/0257213 A1 | 11/2005 | Chu et al. | |
| 2006/0004942 A1 | 1/2006 | Hetherington et al. | |
| 2006/0010352 A1 | 1/2006 | Mukherjee et al. | |
| 2006/0036889 A1 | 2/2006 | Arai | |
| 2006/0265567 A1 | 11/2006 | Ji | |
| 2007/0067318 A1 | 3/2007 | Wolafka et al. | |
| 2007/0067432 A1 | 3/2007 | Tarui et al. | |
| 2007/0067614 A1 | 3/2007 | Berry et al. | |
| 2007/0150713 A1 | 6/2007 | Almeida et al. | |
| 2007/0174553 A1 | 7/2007 | Morrow et al. | |
| 2007/0245423 A1* | 10/2007 | Herington | G06F 21/10 726/31 |
| 2008/0183626 A1 | 7/2008 | Romero et al. | |
| 2008/0229049 A1 | 9/2008 | Nanda et al. | |
| 2008/0229146 A1* | 9/2008 | Arai | G06F 11/203 714/13 |
| 2009/0006710 A1 | 1/2009 | Daniel et al. | |
| 2009/0007120 A1 | 1/2009 | Fenger et al. | |
| 2009/0037657 A1 | 2/2009 | Bresniker | |
| 2009/0119748 A1 | 5/2009 | Yao | |
| 2009/0144579 A1 | 6/2009 | Swanson | |
| 2009/0171511 A1 | 7/2009 | Tolentino | |
| 2009/0172228 A1 | 7/2009 | Zimmer | |
| 2009/0172232 A1 | 7/2009 | Zimmer | |
| 2009/0183016 A1 | 7/2009 | Chan | |
| 2009/0313390 A1 | 12/2009 | Ahuja | |
| 2010/0165874 A1 | 7/2010 | Brown et al. | |
| 2010/0186018 A1 | 7/2010 | Bell et al. | |
| 2011/0093574 A1 | 4/2011 | Koehler | |
| 2011/0113115 A1 | 5/2011 | Chang et al. | |
| 2011/0138219 A1 | 6/2011 | Walton et al. | |
| 2011/0145411 A1 | 6/2011 | Ford et al. | |
| 2011/0145657 A1 | 6/2011 | Bishop et al. | |
| 2012/0017077 A1* | 1/2012 | Darling | G06F 9/5077 713/100 |
| 2012/0047312 A1 | 2/2012 | Nathuji | |
| 2012/0102273 A1 | 4/2012 | Chang et al. | |
| 2012/0110154 A1 | 5/2012 | Adlung et al. | |
| 2012/0110588 A1 | 5/2012 | Bieswanger et al. | |
| 2012/0210042 A1 | 8/2012 | Lim | |
| 2012/0278566 A1 | 11/2012 | Gilson | |
| 2013/0007310 A1 | 1/2013 | Inagaki | |
| 2013/0073811 A1 | 3/2013 | Beckmann et al. | |
| 2013/0275703 A1 | 10/2013 | Schenfeld et al. | |
| 2015/0052293 A1 | 2/2015 | Gaither et al. | |

FOREIGN PATENT DOCUMENTS

| | | |
|---|---|---|
| EP | 0636973 | 2/1995 |
| EP | 2239662 A2 | 10/2010 |
| JP | 2007-172591 | 7/2007 |
| JP | 2007526527 | 9/2007 |
| JP | 2010-250817 | 11/2010 |
| TW | I231424 | 4/2005 |
| TW | 200608188 | 3/2006 |
| TW | 200723089 | 6/2007 |
| TW | 201025025 A | 7/2010 |
| WO | WO-2006004875 A1 | 1/2006 |
| WO | WO-2009154626 A1 | 12/2009 |
| WO | WO-2011071498 | 6/2011 |
| WO | WO-2013126056 | 8/2013 |

OTHER PUBLICATIONS

Cisco Unified Computing System: Architecture for Implementing the Next Phase in an Industry Transition, Nov. 2012, 23 Pgs.

Cisco; Achieve Automated, End-to-end Firmware Management with Cisco UCS Manager, Nov. 28, 2012, 7 Pgs.

Deployment Guide: Deploying 8Gb/s Fibre Channel with HP Bladesystem and VMware VSphere, Jun. 2010, 22 Pgs.

Gostin, Gary et al., "The Architecture of the HP Superdome Shared-Memory Multiprocessor," ICS '05 proceedings of the 19th annual international conference on supercornputing, ACM, pp. 239-245, 2005.

IBM; Expansion Blades; Nov. 28, 2012, 1 Pg.

IBM; IBM BladeCenter HX5 ; Nov. 28, 2012, 2 Pgs.

International Searching Authority, International Search Report & Written Opinion, issued in PCT/US2013/034202, Dec. 2, 2013, 10 pages.

International Searching Authority, International Search Report & Written Opinion, issued in PCT/US2013/034236, Dec. 24, 2013, 9 pages.

International Searching Authority, International Search Report & Written Opinion, issued in PCT/US2013/034277, Dec. 27, 2013, 9 pages.

SGI® Altix® UV Systems Linux® Configuration and Operations Guide; Jun. 2010, 41 Pgs.

Sun Blade 6000 Modular Systems From Oracle®; Jun. 2010, 57 Pgs.

"Advanced Configuration and Power Interface—Wikipedia, the free encyclopedia",Aug. 2011 (Aug. 1, 2011), XP055241714, Retrieved from the Internet on Jan. 15, 2016, 9 pages.

"UEFI vol. 2: Platform Intiitalziation Specification—Driver Execution Environment Core Interface",, Oct. 27, 2011 (Oct. 27, 2011), XP055215981, 218 pages.

"UEFI vol. 4: Platform Initialization Specification—System Management Mode Core Interface",, Oct. 27, 2011 (Oct. 27, 2011), XP055215959, 292 pages.

Andrew S. Tanenbaum, "Introduction," Structured Computer Organization, Ch. 1 (excerpt), 1984, Prentice-Hall Inc., Second Edition, pp. 10-12.

(56) References Cited

OTHER PUBLICATIONS

Anonymous: "System Management Mode—Wikipedia, the free encyclopedia",, Aug. 8, 2011 (Aug. 8, 2011), XP055215778, 4 pages.
EPO, Communication pursuant to Article 94(3) EPC, mailed Feb. 7, 2017, issued in EP App No. 12869523.6, 12 pages.
EPO, Extended Supplementary Search Report, mailed Oct. 13, 2015, EP App No. 12869523.6, 12 pps.
European Patent Office, Extended European Search Report, dated Dec. 2, 2016, issued in EP application No. 13880256.6, 12 pages.
European Patent Office, Extended European Search Report, dated Oct. 20, 2016, issued in EP application No. 13880294.7, 11 pages.
Frey et al, "IBM Unified Resource Manager Introduction and Overview", Jan./Mar. 2012, IBM, pp. 1-10.
International Searching Authority, The International Search Report and the Written Opinion, dated Dec. 27, 2012, issued in International Patent App No. PCT/US2012/035761, 10 Pages.
ISA/KR, International Search Report, mailed Feb. 28, 2013, PCT/US2012/026128 filed Feb. 22, 2012, 9 pages.
Lim et al, "Disaggregated Memory for Expansions and Sharing in Blade Servers", ISCA'09, Jun. 2009, ACM,pp. 1-12.
Loic Duflot, "Using CPU System Management Mode to Circumvent Operating System Security Functions", Cansecwest 2009, 15 pages.
Mayer at al, "Unified Resource Manager Virtualization Management", Jan./Mar. 2012, IBM, pp. 1-9.
USPTO, Final Office Action issued Jul. 11, 2016, in U.S. Appl. No. 14/387,598, filed Apr. 30, 2012, 17 pages.
USPTO, Final Office Action issued Nov. 30, 2016, in U.S. Appl. No. 14/378,971, filed Feb. 22, 2012, 15 pages.
USPTO, Non-final Office Action issued Apr. 19, 2016, in U.S. Appl. No. 14/387,598, filed Apr. 30, 2012), 17 pages.
USPTO, Non-Final Office Action issued Mar. 25, 2016, in U.S. Appl. No. 14/378,971, filed Feb. 22, 2012, 19 pages.

* cited by examiner

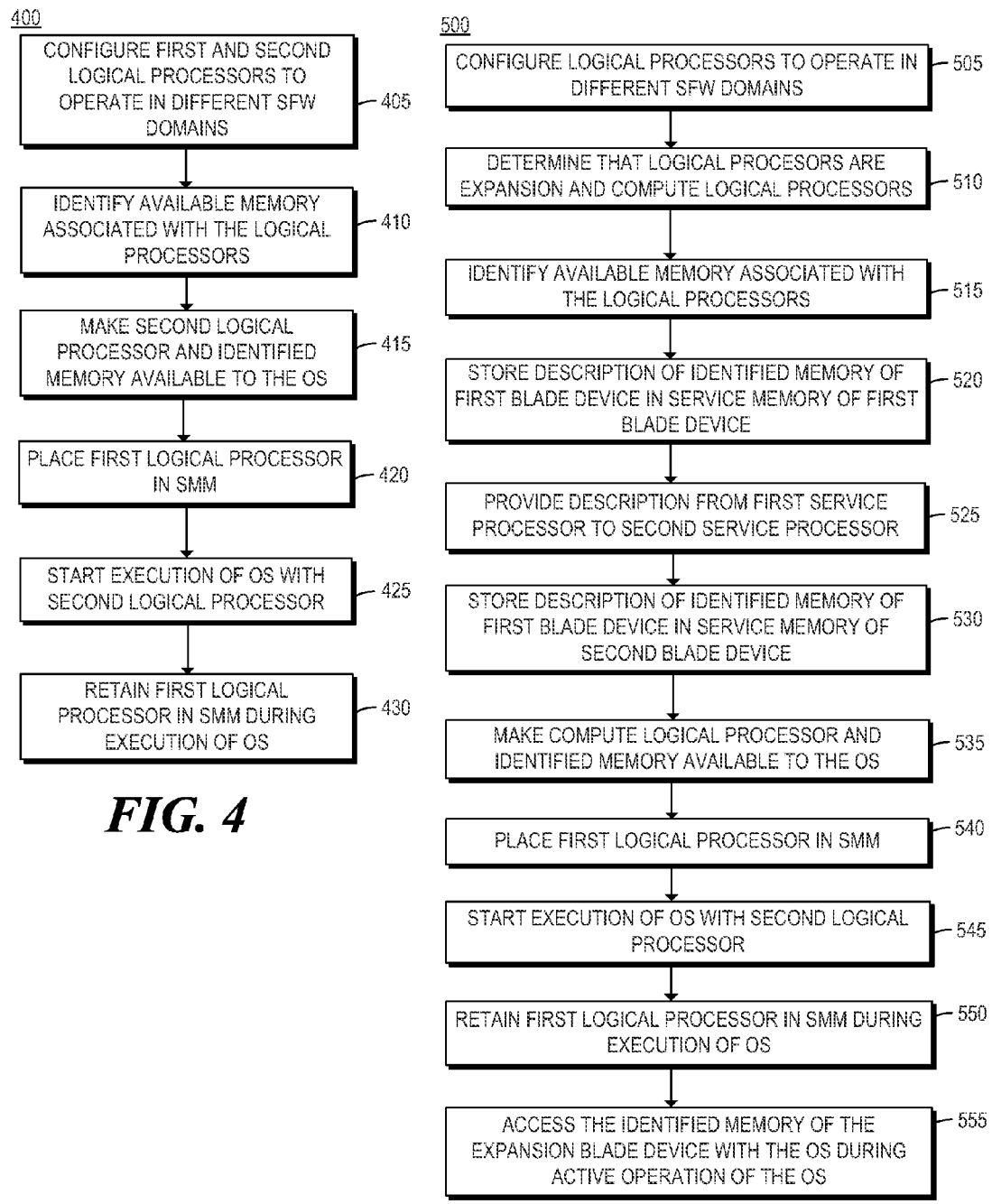

IDENTIFYING MEMORY OF A BLADE DEVICE FOR USE BY AN OPERATING SYSTEM OF A PARTITION INCLUDING THE BLADE DEVICE

BACKGROUND

A blade system may include a plurality of blade devices mounted in a blade enclosure. Each of the blade devices may be a blade server, for example. In some examples, a user may set up a partition of the blade system to include one, several, or all of the blade devices mounted in the blade enclosure. In such examples, the partition may run an operating system (OS) and run application(s) with the OS.

BRIEF DESCRIPTION OF THE DRAWINGS

The following detailed description references the drawings, wherein:

FIG. 4 is a flowchart of an example method for retaining a first logical processor in a system management mode (SMM) during execution of an OS with a second logical processor; and FIG. 5 is a flowchart of an example method for making available, for use by an OS of a partition, memory of first and second logical processors of the partition configured to operate in different SFW domains.

DETAILED DESCRIPTION

Figure 1:
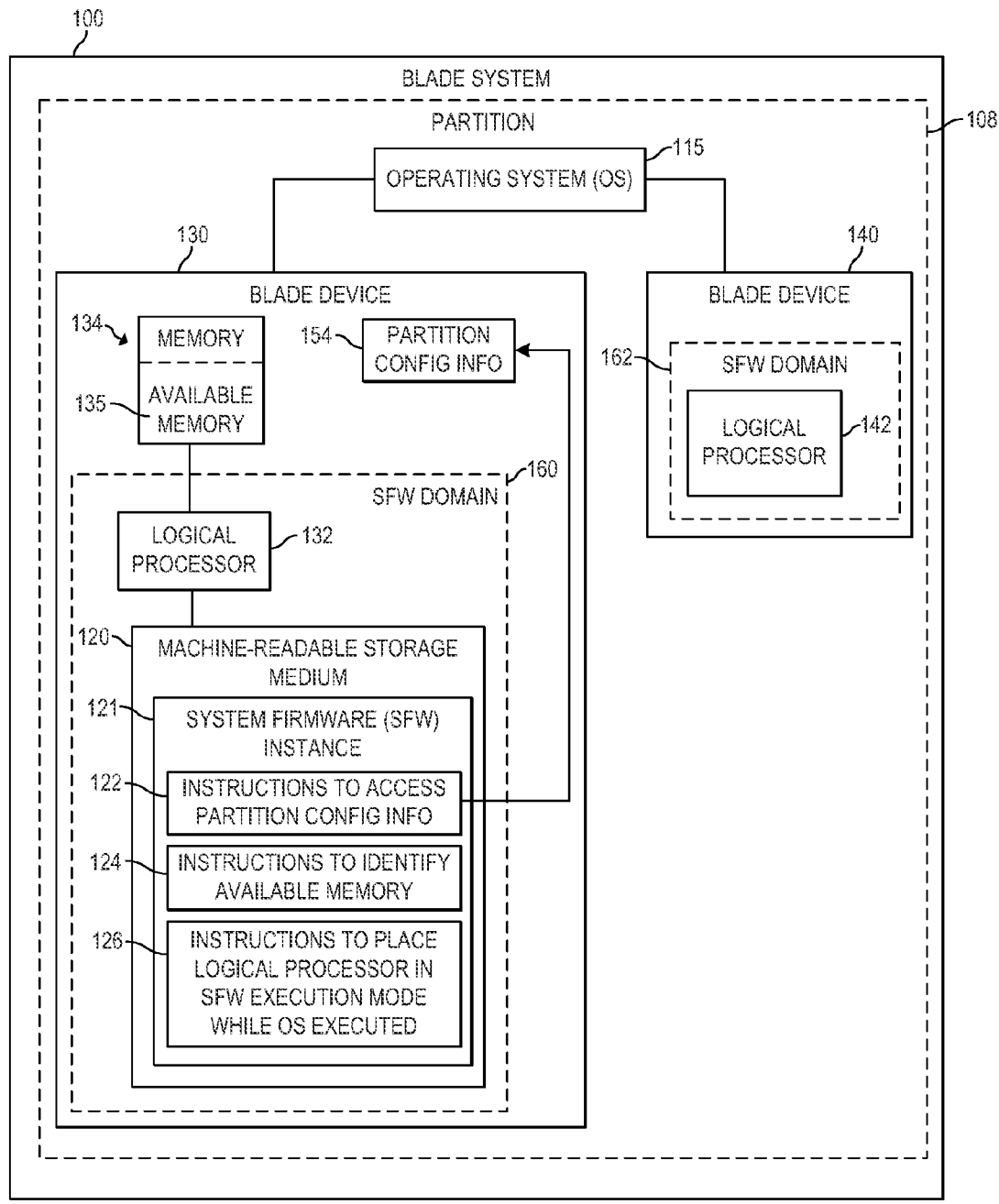
FIG. 1 is a block diagram of an example blade system to place a first logical processor in a system firmware (SFW) execution mode while an operating system (OS) is executed by at least a second logical processor.

As noted above, a partition of a blade system may run an operating system (OS) and run application(s) with the OS. The partition that runs the OS may include multiple blade devices, each including logical processor(s) and memory. Each logical processor may be included on an integrated circuit (IC) (e.g., a chip). An IC including at least one central processing unit (CPU) may be referred to herein as a "CPU IC". In some examples, in addition to logical processor(s), a CPU IC may include at least one integrated memory controller to manage memory of the blade device. In such examples, a memory controller of a CPU IC may be able to manage a relatively limited amount of memory, which may limit the amount of memory available on a blade device, and thus in a partition.

More memory may be added to a partition by adding additional blade device(s) to the partition. However, license costs for some applications run by the OS may be calculated based on the number logical processors available for the application to utilize. As such, adding blade devices to a partition may substantially increase license costs for some applications due to the availability of the logical processors of the added blade devices.

To address these issues, examples described herein may relate to a partition of a blade system, where the partition is to execute an OS and comprises expansion and compute blade devices including first and second logical processors, respectively, wherein the first and second logical processors are to operate in different system firmware (SFW) domains. Examples described herein may place the first logical processor of the expansion blade device in a SFW execution mode in which the first logical processor is to execute instructions of the SFW instance while the OS is executed by at least the second logical processor of the compute blade device. Examples described herein may further make available, for use by the OS, memory of the expansion blade device associated with the first logical processor.

By placing the first and second logical processors in different SFW domains, and not identifying the first logical processor to the OS, examples described herein may enable the OS of the partition to utilize memory of the expansion blade device without exposing the first logical processor of the expansion blade device to the OS or application(s) run by the OS. As such, examples described herein may enable a partition to use memory of an expansion blade device for running an OS and application(s), without logical processor(s) of the expansion blade device increasing application license costs.

In examples described herein, by placing logical processor(s) of an expansion blade device in a SFW execution mode during execution of the OS by the partition, the logical processor(s) may remain available to execute instructions of a SFW instance to, for example, collect error information at the expansion blade device, or otherwise manage resources of the expansion blade device under the control of instructions of the SFW instance, while remaining unavailable for use by the OS.

Additionally, by operating logical processors of the expansion and compute blade devices in different SFW domains, examples described herein may enable the partition to utilize expansion and compute blade devices having logical processors with different designs. In such examples, the expansion blade device may include logical processor(s) that are less expensive than logical processor(s) of a compute blade device. In this manner, examples described herein may enable the memory of a partition to be supplemented by memory provided by an expansion blade device that is less expensive than the compute blade device.

Referring now to the drawings, FIG. 1 is a block diagram of an example blade system 100 to place a first logical processor 132 in a SFW execution mode while an OS is executed by at least a second logical processor 142. In examples described herein, a blade system may be a computing system comprising a blade enclosure and at least one blade device mounted in the blade enclosure. In the example of FIG. 1, blade system 100 comprises blade devices 130 and 140 each mounted in a blade enclosure of blade system 100. Blade system 100 may run an OS 115 with resources of each of blade devices 130 and 140. For example, OS 115 may be run by a partition 108 of blade system 100 including at least blade devices 130 and 140.

As used herein, a "blade device" may be a physical computing device that comprises memory and at least one logical processor, and that is mountable to a blade enclosure. In some examples, a blade device may be a modular computing device that is physically mountable to a blade enclosure for operation, that includes certain core computing resources (e.g., CPU IC(s) and memory), and that excludes certain peripheral computing resource(s) (e.g., a power supply, cooling fan(s), external networking ports, and the like, or a combination thereof). As used herein, a "blade enclosure" may be a chassis to receive a plurality of blade devices and provide at least one peripheral resource for the received blade devices. For example, a blade enclosure may include fan(s) to cool mounted blade devices, at least one power supply to provide power to mounted blade devices, external network ports for mounted blade devices, and the like, or a combination thereof.

In the example of FIG. 1, blade device 130 may include a logical processor 132 and memory 134 associated with logical processor 132. In examples described herein, logical processor 132 may be referred to herein as an "expansion" logical processor 132, and blade device 130 may be referred to herein as an "expansion" blade device 130. In some examples, blade device 130 may include a plurality of logical processors, some or all of which having associated memory. Blade device 140 may include a logical processor 142. In some examples, blade device 140 may include memory associated with logical processor 142. In examples described herein, logical processor 142 may be referred to herein as a "compute" logical processor 142, and blade device 140 may be referred to herein as a "compute" blade device 140. In some examples, blade device 140 may include a plurality of logical processors, some or all of which having associated memory. As used herein, a "logical processor" may be a CPU IC, a CPU of a CPU IC (e.g., one of a plurality of cores on a multi-core CPU IC), or a thread on a CPU (or core) of a CPU IC.

Any expansion blade device or compute blade device described herein may be a blade device as described above. In examples described herein, an expansion blade device may be a blade device designated to provide memory, but not logical processor(s), for use by an OS of a partition including the blade device. In examples described herein, a compute blade device may be a blade device designated to provide memory and logical processor(s) for use by an OS of a partition including the blade device. In some examples, each blade device of a partition may be designated as an expansion or compute blade device in partition configuration information describing aspects of the configuration of the partition. Additionally, any expansion logical processor or compute logical processor described herein may be a logical processor as described above. In examples described herein, an expansion logical processor may be a logical processor of an expansion blade device and a compute logical processor may be a logical processor of a compute blade device.

As used herein, memory "associated with" a logical processor (or "associated" memory of a logical processor) is memory managed by a memory controller integrated on the CPU IC including or constituting the logical processor. For example, a blade device including memory associated with a logical processor may comprise at least one memory module and a CPU IC including at least one logical processor (e.g., CPU or core) and at least one integrated memory controller to manage the memory module(s). In some examples, a blade device may include a plurality of CPU ICs, each including at least one integrated memory controller to manage memory module(s) of the blade device. As used herein, a memory module may be, for example, a dual in-line memory module (DIMM), a single in-line memory module (SIMM), or any other type of memory module including a plurality of memory devices.

In the example of FIG. 1, blade device 130 includes a machine-readable storage medium 120 encoded with a SFW instance 121 including instructions 122, 124, and 126. In some examples, SFW instance 121 may include additional instructions. As used herein, a "machine-readable storage medium" may be any electronic, magnetic, optical, or other physical storage apparatus to contain or store information such as executable instructions, data, and the like. For example, any machine-readable storage medium described herein may be any of random access memory (RAM), read-only memory (ROM), volatile memory, non-volatile memory, flash memory, a storage drive (e.g., a hard drive), a solid state drive, any type of storage disc (e.g., a Compact Disc Read Only Memory (CD-ROM), any other type of compact disc, a DVD, etc.), and the like, or a combination thereof. Further, any machine-readable storage medium described herein may be non-transitory. Any "memory" described herein may be at least a portion of at least one machine-readable storage medium.

In the example of FIG. 1, instructions of SFW instance 121 are executable by logical processor 132 to perform the functionalities described below in relation to SFW instance 121. Logical processor 132 may fetch, decode, and execute instructions stored on storage medium 120 to perform the functionalities described below. In the example of FIG. 1, storage medium 120 may be a ROM storing SFW instance 121. In some examples, storage medium 120 may be included on another blade device mounted in the blade device enclosure of blade system 100. As used herein, a "system firmware instance" (or "SFW instance") may be a set of machine executable instructions to boot and manage resources of a blade device. For example, after a reset, a logical processor of a blade device may begin to execute instructions of a SFW instance to initialize the logical processor for operation, and to initialize other resource(s) of the blade device, such as the memory associated with the logical processor. In some examples, this initialization of the logical processor and the associated memory may include a power-on self-test (POST) implemented by the SFW instance.

Instructions of a SFW instance, when executed by the logical processor, may also configure the logical processor to operate in a SFW domain associated with the SFW instance. As used herein, a "system firmware domain" (or "SFW domain") associated with a SFW instance may be an environment in which a logical processor booted by the SFW instance may operate when executing instructions of the SFW instance after booting. In some examples, a SFW domain may include a plurality of SFW resources, including, for example, SFW data structure(s) and SFW code (i.e., machine executable instructions). As used herein, a logical processor operating as part of a SFW domain may be a logical processor having access to the SFW resources of the SFW domain. In some examples, the SFW resources (e.g., the SFW data structure(s) and SFW code) of the SFW domain may be stored in a system management memory region (e.g., SMRAM) for the SFW domain. In such examples, a logical processor operating as part of a SFW domain may be a logical processor having access to the SFW resources stored in the system management memory region for the SFW domain. A logical processor operating as part of a SFW domain may not have access to the SFW resources in the system management memory region at all times. Rather, the logical processor may have access at certain times (e.g., while booting), in certain mode(s) (e.g., a system management node (SMM)), etc. In examples described herein, a logical processor having such limited access may still be considered to have access to the SFW resources in the system management memory region. In some examples, the system management memory region may be at least a portion of a machine-readable storage medium of at least one blade device mounted in a blade enclosure and including the logical processor having access to the region.

The SFW data structures may include, for example, advanced configuration and power interface (ACPI) table(s), system management BIOS (SMBIOS) table(s), memory data structures, interrupt vector(s), semaphores, and the like, or a combination thereof. The SFW data structure(s) may be generated and stored in the system management memory region by logical processor(s) executing instructions of the SFW instance. The SFW code may include executable instructions implementing interrupt service routines, such as system management interrupt (SMI) handler(s), or the like. The SFW code may also include executable instructions implementing error handler(s). The SFW code may be instructions of the SFW instance copied into the system management memory region.

In the example of FIG. 1, logical processors 132 and 142 may be configured to operate as part of different SFW domains 160 and 162, respectively. In examples described herein, logical processors configured to operate as part of different SFW domains may be logical processors that are configured to access different SFW resources in different system management memory regions (e.g., different SMRAM regions). In such examples, a logical processor configured to operate as part of a first SFW domain may not have access to any SFW resources of a second SFW domain. For example, logical processor 132 configured to operate as part of SFW domain 160 may have access (e.g., in SMM) to first SFW resources for SFW domain 160 stored in a first system management memory region (e.g., SMRAM), and may not have access to second SFW resources for SFW domain 162 stored in a second system management memory region (e.g., SMRAM). In such examples, logical processor 142 configured to operate as part of SFW domain 162 may have access (e.g., in SMM) to the second SFW resources for SFW domain 162 stored in the second system management memory region, and may not have access to the first SFW resources for SFW domain 160 stored in the first system management memory region.

In some examples, logical processors may be configured to operate as part of different SFW domains by booting each of the logical processors with different SFW instances. In the example of FIG. 1, logical processors 132 and 142 may be configured to operate as part of different SFW domains by booting logical processor 132 with instructions of SFW instance 121 and booting logical processor 142 with instructions of another SFW instance different than SFW instance 121.

In the example of FIG. 1, after a reset of at least a portion of blade system 100 (e.g., a reset of partition 108), instructions 122 of SFW instance 121, when executed by logical processor 132, may configure logical processor 132 to operate as part of a SFW domain 160 associated with SFW instance 121. For example, instructions 122 may configure hardware address map(s) of logical processor 132 such that logical processor 132 is to access first SFW resources, for SFW domain 160, stored in the first system management memory region (e.g., SMRAM). In such examples, the first SFW resources may include SFW code (e.g., SMI handler(s), etc.) and state information (e.g., information regarding pending interrupts, loaded drivers, loaded ACPI tables, etc.) for SFW domain 160. In some examples, the first system management memory region may be a region of memory (e.g., RAM) of blade device 130 (e.g., a region of memory 134) or of another blade device of partition 108.

Also after the reset, logical processor 142 may execute instructions of another SFW instance to configure logical processor 142 to operate as part of a SFW domain 162 different than SFW domain 160 and associated with the other SFW instance. For example, the instructions may configure hardware address map(s) of logical processor 142 such that logical processor 142 is to access second SFW resources, for SFW domain 162, stored in a second system management memory region (e.g., SMRAM) different than the first system management memory region. In such examples, the second SFW resources, which are different than the first SFW resources, may include SFW code (e.g., SMI handler(s), etc.) and state information (e.g., information regarding pending interrupts, loaded drivers, loaded ACPI tables, etc.) for SFW domain 162. In some examples, the second system management memory region may be a region of memory (e.g., RAM) of blade device 140 or of another blade device of partition 108.

In the example of FIG. 1, when executed by logical processor 132, instructions 124 may identify, to blade device 140, available memory 135 of blade device 130 that is associated with logical processor 132. In some examples, the memory 135 identified by instructions 124 may be memory determined to be available for use by an OS of blade system 100, such as OS 115. For example, logical processor 132 may execute instructions 124 to identify available memory 135 among memory 134 associated with logical processor 132. In some examples, logical processor 132 may execute instructions 124 as part of its boot process after a reset. In such examples, instructions 124 may determine the amount of memory 134 associated with logical processor 132 and then test memory 134 to determine what portion of memory 134 is useable (i.e., functional). In some examples, instructions 124 may identify at least a portion of the memory 134 determined to be useable as memory 135 available for use by OS 115 (i.e., available memory 135). For example, logical processor 132 may reserve a portion of useable memory 134 for use by logical processor 132 (e.g., when executing instructions of SFW instance 121), and identify the remainder of useable memory 134 as memory 135 available for use by OS 115.

Logical processor 132 executing instructions 124 may also store a description of the identified available memory 135 in a service memory of blade device 130 such that a service processor of blade device 130 may provide the description to a monarch logical processor (e.g., a bootstrap logical processor) in charge of coordinating the booting of partition 108 to run OS 115. The description of identified available memory 135 may be in any suitable format, data structure, etc. (e.g., a table, etc.). In some examples, logical processor 142 may be the monarch logical processor. In such examples, by storing the description of the available memory 135 in the service memory of blade device 130, a service processor of blade device 130 may access the description and provide it to blade device 140 including logical processor 142. In such examples, logical processor 132 may identify the available memory to logical processor 142 by storing the description in the service memory of blade device 130. Blade device 140 may make the identified memory 135 of blade device 130 available for use by OS 115, as described below.

In the example of FIG. 1, logical processor 132, executing instructions 122 of SFW instance 121, may access partition configuration information 154 for blade device 130. In examples described herein, partition configuration information for a blade device may describe at least some aspects of the configuration of a partition that are related to the blade device. For example, partition configuration information 154 may indicate (e.g., via a flag, etc.) whether blade device 130 is designated as an expansion or compute blade device for partition 108. Logical processor 132 may access partition configuration information 154 in service memory of blade device 130 or in the first system management memory region for SFW domain 160 after it is copied from the service memory, for example.

In response to a determination that partition configuration information 154 indicates that blade device 130 is an expansion blade device, instructions 126, executed by logical processor 132, may hide the identified memory 135 of blade device 130 from logical processor 132 and place logical processor 132 in a SFW execution mode. For example, when executed by logical processor 132, instructions 126 may hide identified memory 135 by setting source address decoders of logical processor 132 such that logical processor 132 is not able to access any of identified memory 135. In such examples, instructions 126 may set the source address decoders of logical processor 132 such that they contain no address translations for any address among the identified memory 135 of memory 134. In this manner, instructions 126 may firewall, from logical processor 132, the identified memory 135 available for use by OS 115. In some examples, instructions 126 may receive an indication of a select portion of identified memory 135 that will be made available to OS 115 and may hide the select portion from logical processor 132 and not the remaining portions.

Also in response to the determination that partition configuration information 154 indicates that blade device 130 is an expansion blade device, instructions 126, executed by logical processor 132, may place logical processor 132 in a SFW execution mode, in which logical processor 132 is to execute instructions of SFW instance 121 while OS 115 is executed by at least logical processor 142 of blade device 140. In some examples, the SFW execution mode may be SMM. For example, instructions 126, when executed by logical processor 132, may cause logical processor 132 to enter SMM and remain in SMM while OS 115 is executed by at least logical processor 142. In examples described herein, system management mode (SMM) may be a mode in which a logical processor executes SFW code of a SFW domain in which the logical processor is configured to operate. In SMM, logical processor 132 may have access to the first system management memory region (e.g., SMRAM) of SFW domain 160 associated with SFW instance 121, and may execute SFW code (e.g., instructions of SFW instance 121) stored in the first system management memory region. In SMM, logical processor 132 is not available to be utilized by OS 115 to run any portion of OS 115 or any portion of any application run in OS 115, for example.

Further, in SMM, logical processor 132 remains available to execute instructions of SFW instance 121, such as instructions of an SMI handler in response to detection of an SMI, and instructions of an error handler in response to an error indication, for example. In such examples, the instructions of the SMI handler and the error handler may be instructions of SFW instance 121 and may have been copied into the first system management memory region during the boot process. In such examples, in SMM, logical processor 132 may execute these instructions out of the first system management memory region.

In other examples, the SFW execution mode may be any suitable state in which a logical processor of a partition is to execute code of a SFW instance while other logical processor(s) of the partition are executing an OS. For example, instructions 126 may cause logical processor 132 to execute a loop, implemented by instructions of SFW instance 121, such that logical processor 132 remains executing instructions of SFW instance 121 while other logical processor(s) of the partition are executing an OS, and such that logical processor 132 is available to be taken out of the loop to execute other SFW code, such as an SMI or error handler, as described above.

As noted above, in some examples, instructions 124 executed by logical processor 132 may identify available memory 135 to logical processor 142 by storing the description of the available memory 135 in the shared memory region of blade system 100. In such examples, logical processor 142 may be the monarch logical processor and may make identified memory 135 of blade device 130 available for use by OS 115. For example, logical processor 142 may provide, to OS 115, information identifying memory 135 of blade device 130 in any suitable format or data structure (e.g., table(s), etc.). For example, logical processor 142 may provide this information to OS 115 in at least one ACPI table stored in a region of memory of blade system 100 that is accessible to OS 115. In some examples, logical processor 142 may also make available to OS 115 other resources of partition 108, such as available memory of blade device 140 and logical processor 142, by also identifying those other resources in the ACPI table(s) stored in the memory region accessible to OS 115.

In the example of FIG. 1, the monarch logical processor may not identify logical processor 132 as available for use by OS 115. For example, because logical processors 132 and 142 are configured to operate in different SFW domains 160 and 162, respectively, logical processor 132 may not be visible to logical processor 142. Further, logical processor 132 may not identify itself to logical processor 142 as available for use by OS 115. As such, in examples in which logical processor 142 is the monarch logical processor, logical processor 142 may not identify logical processor 132 as available for use by OS 115. For example, the ACPI table(s) provided to OS 115 by logical processor 142 may include identifications of logical processor 142, available memory 135 of blade device 130, and available memory of blade device 140, and may exclude any identification of logical processor 132. In such examples, logical processor 132 may be unavailable for use by OS 115 and the identified memory 135 made available for use by OS 115 may be made unavailable for use by logical processor 132, as described above.

After logical processor 142 and the identified memory of blade devices 130 and 140 (including memory 135) are made available to OS 115. OS 115 may execute on partition 108 utilizing the resources identified to OS 115 (e.g., in the ACPI table(s)). For example, OS 115 may execute and run application(s) using logical processor 142 and the identified available memory of blade device 130 and 140 while logical processor 132 is unavailable for use by OS 115 or any application(s) run by OS 115. In some examples, functionalities described herein in relation to FIG. 1 may be provided in combination with functionalities described herein in relation to any of FIGS. 2-5.

Figure 2:
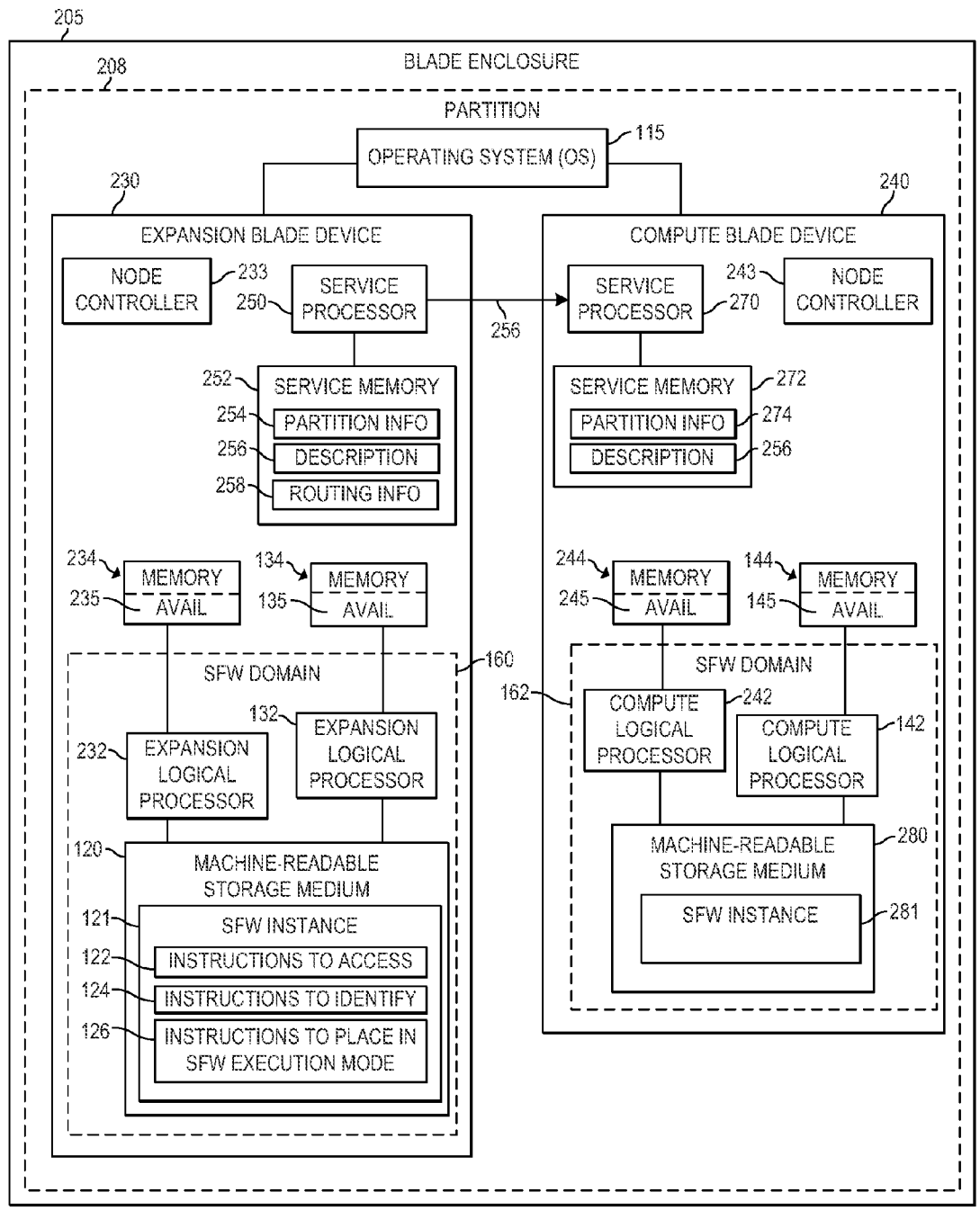
FIG. 2 is a block diagram of an example blade system to place a plurality of logical processors of a partition in a SFW execution mode while an OS is executed by another logical processor of the partition.

FIG. 2 is a block diagram of an example blade system 200 to place a plurality of logical processors of a partition 208 in a SFW execution mode while an OS is executed by another logical processor of the partition. In the example of FIG. 2, blade system 200 comprises a blade enclosure 205, and blade devices 230 and 240 mounted in blade enclosure 205. Blade device 230 may be referred to herein as an expansion blade device 230, and blade device 240 may be referred to herein as a compute blade device 240. Blade system 200 may run an OS 115, as described above in relation to FIG. 1, with resources of each of blade devices 230 and 240. For example, OS 115 may be run by a partition 208 of blade system 200, the partition 208 including at least blade devices 230 and 240.

In the example of FIG. 2, expansion blade device 230 may include a logical processor 132 and memory 134 associated with logical processor 132, as described above in relation to FIG. 1. Expansion blade device 230 may also include a logical processor 232 associated with memory 234 of blade device 230. In other examples, blade device 230 may include more than two logical processors, some or all of which having associated memory. Each of logical processors 132 and 232 may be referred to herein as expansion logical processors. Compute blade device 240 may include a logical processor 142, as described above in relation to FIG. 1, and memory 144 associated with compute logical processor 142. Compute blade device 240 may also include a logical processor 242 associated with memory 244 of blade device 240. In other examples, blade device 240 may include more than two logical processors, some or all of which having associated memory. Each of logical processors 142 and 242 may be referred to herein as compute logical processors.

Blade device 230 includes a machine-readable storage medium 120 encoded with SFW instance 121 including instructions 122, 124, and 126, as described above in relation to FIG. 1. Instructions of SFW instance 121 are executable by logical processors 132 and 232 to perform the functionalities described below in relation to SFW instance 121. Blade device 240 includes a machine-readable storage medium 280 encoded with a SFW instance 281 including instructions executable by logical processors 142 and 242 to perform the functionalities described below in relation to SFW instance 281.

In the example of FIG. 2, after a reset of at least a portion of blade system 200 (e.g., partition 208), instructions 122 may configure each of logical processors 132 and 232 to operate as part of SFW domain 160 associated with SFW instance 121, as described above in relation to blade system 100 of FIG. 1. For example, each of logical processors 132 and 232 may be booted with SFW instance 121. In such examples, logical processors 132 and 232 are configured to operate as part of the same SFW domain 160. In examples described herein, logical processors configured to operate as part of a single SFW domain (i.e., the same SFW domain) may be logical processors that are each configured to access the SFW resources of the SFW domain. For example, the logical processors may each have access (e.g., in SMM) to the system management memory region storing the SFW resources for the SFW domain.

For example, when executed by logical processors 132 and 232, instructions 122 may configure the respective hardware address maps of logical processors 132 and 232 to be the same. In some examples, instructions 122 may configure the respective hardware address maps such that logical processors 132 and 232 each have access to the same SFW resources (i.e., of SFW domain 160) in a first system management memory region for SFW domain 160. Instructions 122 may configure the hardware address maps such that logical processors 132 and 232 access the same SFW code and same state information for SFW domain 160. Also, after the reset, instructions of SFW instance 281 may configure each of logical processors 142 and 242 to operate as part of SFW domain 162 associated with SFW instance 281 (i.e., as part of the same SFW domain), as described above in relation to logical processors 132 and 232 of SFW domain 160. In the example of FIG. 2, SFW domains 160 and 162 are different SFW domains.

In the example of FIG. 2, when executed by a plurality of logical processors of blade device 230, instructions 124 may identify available memory of blade device 230 associated with any one of the plurality of logical processors, as described above in relation to FIG. 1. For example, when executing instructions 124, logical processor 132 may identify available memory 135 of memory 134, and logical processor 232 may identify available memory 235 of memory 234. Additionally, when executing instructions 124, each of the plurality of logical processors may store description(s) of the identified memory in a service memory 252 of blade device 230 accessible to a service processor 250 of blade device 230. For example, when executing instructions 124, logical processors 132 and 232 may store description(s) 256 of identified memory 135 and 235 in service memory 252. Description(s) 256 may be a single description of the memory identified by each of the logical processors, or separate descriptions of the memory identified memory by each logical processor.

Service processor 250 may provide description(s) 256 to blade device 240 in examples in which blade device 240 includes the monarch logical processor for partition 208. For example, if logical processor 142 is the monarch logical processor, service processor 250 may provide description(s) 256 to blade device 240 by retrieving description(s) 256 from service memory 252 and providing description(s) 256 to a service processor 270 of blade device 240. Service processor 270 may store the received description(s) 256 in service memory 272 of blade device 240, where description(s) 256 are accessible to logical processor 142. In examples described herein, a service processor may be at least one of a CPU, a semiconductor-based microprocessor, other electronic circuitry suitable for the retrieval and execution instructions stored on a machine-readable storage medium, or a combination thereof.

Additionally, in the example of FIG. 2, a plurality of logical processors of blade device 240 may execute instructions of SFW instance 281 to identify available memory of blade device 240 associated with the respective logical processors, as described above in relation to blade device 230. For example, logical processor 142 may identify available memory 145 of memory 144, and logical processor 242 may identify available memory 245 of memory 244.

In some examples, the monarch logical processor may determine the overall memory map to be provided to OS 115, which may include at least some of identified memory 135, 235, 145, and 245. In such examples, after the monarch logical processor determines the memory map, service processor 250 may receive routing information 258 and store it in service memory 252. In such examples, logical processors 132 and 232, executing instructions 122, may utilize routing information 258 to configure blade device 230 to route memory transactions, from OS 115 and targeting identified memory of blade device 230 (e.g., memory 135 and 235), to the identified memory with a node controller 233 of blade device 230. For example, instructions 122 may set routing table(s) in node controller 233 to route, to the identified memory of blade device 230, memory transactions from OS 115 targeting the identified memory.

In such examples, instructions of SFW instance 281, executed by logical processors 142 and 242, may also configure blade device 240 to route, through node controllers 243 and 233, memory transactions targeting the identified memory of blade device 230. For example, the instructions may set routing table(s) in logical processors 142 and 242 to route memory transactions targeting the identified memory of blade device 230 through node controller 243, and may set routing table(s) in node controller 243 to route the transactions through node controller 233 of blade device 230. The functionalities of each of node controllers 233 and 243 may be implemented in the form of electronic circuitry, in the form of executable instructions encoded on a machine-readable storage medium, or a combination thereof.

In the example of FIG. 2, logical processor 132, executing instructions 122 of SFW instance 121, may access partition configuration information 254 for blade device 230 and determine whether blade device 230 is an expansion or compute blade device based on information 254 (e.g., based on a flag in information 254). In the example of FIG. 2, partition configuration information 254 may be received by service processor 250 (e.g., from a partition manager for partition 208) and stored in service memory 252. Logical processor 132 may access partition configuration information 254 in service memory 252 or in the first system management memory region for SFW domain 160 after it has been copied there from service memory 252. In the example of FIG. 2, partition configuration information 274, indicating whether blade device 240 is an expansion or compute blade device, may be stored in service memory 272 and may be accessed by logical processors 142 and 242 to determine whether blade device 240 is an expansion or compute blade device.

In examples in which partition configuration information 254 indicates that blade device 230 is an expansion blade device, instructions 126, executed by the logical processors of blade device 230 may hide each region of the identified memory of blade device 230 from the respective logical processor with which it is associated and place each of the plurality of logical processors of blade device 230 in a SFW execution mode, as described above in relation to FIG. 1. For example, instructions 126 may hide identified memory 135 from logical processor 132 and place logical processor 132 in a SFW execution mode (e.g., SMM), and instructions 126 may hide identified memory 235 from logical processor 232 and place logical processor 232 in a SFW execution mode (e.g., SMM).

In some examples, each of the plurality of logical processors may be placed in the SFW execution mode such that each of the logical processors is to execute instructions of SFW instance 121 while the OS is executed by at least logical processor 142 of blade device 240. In other examples, one logical processor of blade device 230 may be placed in the SFW execution mode, while the other logical processors of blade device 230 may not remain available to execute instructions of SFW instance 121. For example, the rest of the logical processors may be placed in a halt state, an initialization state (e.g., waiting for startup inter-processor interrupt (SIPI)), or the like. In such examples, the one logical processor remaining available to execute instructions of SFW instance 121 may be used for management of the blade device.

After the logical processors of blade device 230 are placed in the SFW execution mode, the monarch logical processor may make the identified memory of blade device 230 available for use by OS 115. In examples in which logical processor 142 is the monarch logical processor, logical processor 142 may provide, to OS 115, information identifying memory 135 and 235 of blade device 230 in any suitable format or data structure (e.g., table(s), etc.). For example, logical processor 142 may provide this information to OS 115 in at least one ACPI table stored in a region of memory of blade system 100 that is accessible to OS 115. In some examples, logical processor 142 may also make available to OS 115 other resources of partition 208, such as available memory 145 and 245 of blade device 240 and logical processors 142 and 242, by also identifying those other resources in the ACPI table(s) stored in the memory region accessible to OS 115. In such examples, the monarch logical processor does not identify logical processors 132 and 232 as available for use by OS 115, as described above in relation to FIG. 1.

After logical processors 142 and 242, and the identified memory of blade devices 230 and 240 are made available to OS 115, OS 115 may run on partition 208 utilizing the resources identified to OS 115 (e.g., in the ACPI table(s)). For example, OS 115 may execute and run application(s) using logical processors 142 and 242 and the identified available memory of blade device 230 and 240 while logical processors 132 and 232 are unavailable for use by OS 115 or any application(s) run by OS 115. In some examples, functionalities described herein in relation to FIG. 2 may be provided in combination with functionalities described herein in relation to any of FIGS. 1 and 3-5.

Figure 3:
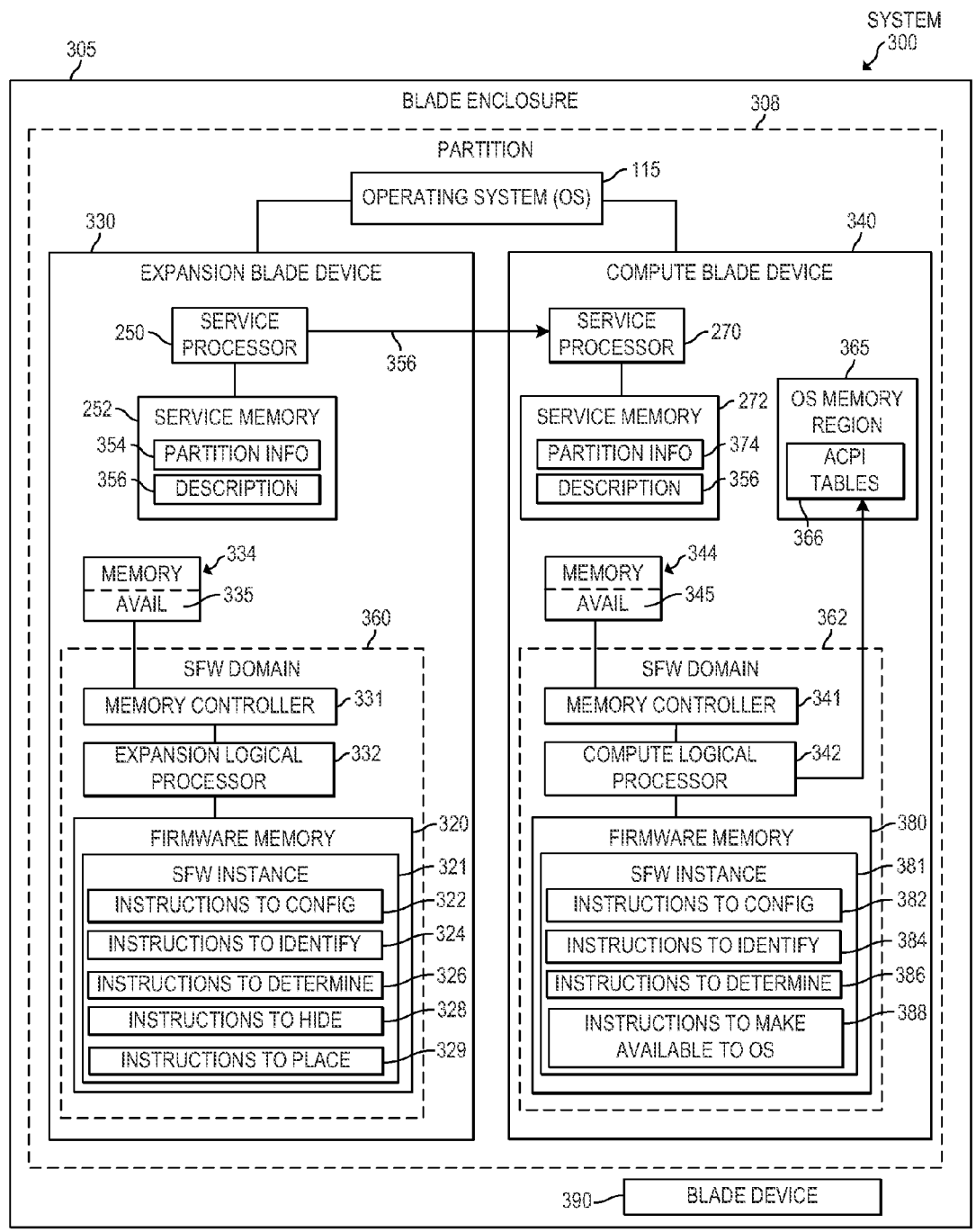
FIG. 3 is a block diagram of an example system to place a logical processor of a partition of the system in a SFW execution mode and make available, to an OS of the partition, memory associated with the logical processor.

FIG. 3 is a block diagram of an example system 300 to place a logical processor of a partition of system 300 in a SFW execution mode and make available, to an OS of the partition, memory associated with the logical processor. In the example of FIG. 3, system 300 (e.g., blade system 300) comprises a blade enclosure 305, and blade devices 330, 340, and 390 mounted in blade enclosure 305. In other examples, system 300 may include more or fewer blade devices mounted in blade enclosure 305. Blade device 330 may be referred to herein as an expansion blade device 330, and blade device 340 may be referred to herein as a compute blade device 340.

In the example of FIG. 3, expansion blade device 330 comprises a logical processor 332, memory 334 associated with logical processor 332, and a memory controller 331 to manage memory 334. Logical processor 332 may be referred to herein as an expansion logical processor 332. Memory controller 331 and expansion logical processor 332 may be integrated into a single CPU IC. For example, memory controller 331 may be integrated in a CPU IC comprising or constituting logical processor 332. In some examples, the CPU IC including logical processor 332 and memory controller 331 may also include additional memory controller(s) to manage other memory of blade device 330. In some examples, blade device 330 may include a plurality of logical processors, some or all of which having associated memory.

Compute blade device 340 comprises a logical processor 342, memory 344 associated with logical processor 342, and a memory controller 341 to manage memory 344. Logical processor 342 may be referred to herein as a compute logical processor 342. Memory controller 341 and logical processor 342 may be integrated into a single CPU IC. For example, memory controller 341 may be integrated in a CPU IC comprising or constituting logical processor 342. In some examples, the CPU IC including logical processor 342 and memory controller 341 may also include additional memory controller(s) to manage other memory of blade device 340. In some examples, blade device 340 may include a plurality of logical processors, some or all of which having associated memory. The functionalities of each of memory controllers 331 and 341 may be implemented in the form of electronic circuitry, in the form of executable instructions encoded on a machine-readable storage medium, or a combination thereof.

Blade system 300 may run an OS 115, as described above in relation to FIG. 1, with resources of each of blade devices 330 and 340. For example, OS 115 may be run by a partition 308 of blade system 300 including at least blade devices 330 and 340. In the example of FIG. 3, partition 308 may omit at least one blade device of system 300, such as blade device 390, for example. In other examples, partition 308 may include additional blade devices mounted in blade enclosure 305.

In the example of FIG. 3, blade device 330 includes firmware memory 320 encoded with a SFW instance 321 including instructions 322, 324, 326, 328, and 329. In some examples, SFW instance 321 may include additional instructions. Instructions of SFW instance 321 are executable by at least logical processor 332 to perform the functionalities described below in relation to SFW instance 321. Blade device 340 includes firmware memory 380 encoded with a SFW instance 381 including instructions 382, 384, 386, and 388. In some examples, SFW instance 381 may include additional instructions. Instructions of SFW instance 381 are executable by at least logical processor 342 to perform the functionalities described below in relation to SFW instance 381. In the example of FIG. 3, SFW instance 381 is executable to boot partition 308 to execute OS 115. In the example of FIG. 3, blade device 330 includes a service processor 250 and service memory 252, and blade device 340 includes a service processor 270 and service memory 272, as described above in relation to FIG. 2.

In the example of FIG. 3, after a reset of at least partition 308, instructions 322, when executed by logical processor 332, may configure logical processor 332 to operate as part of a SFW domain 360 associated with SFW instance 321, as described above in relation to FIG. 1. Also after the reset, instructions 382, when executed by logical processor 342, may configure logical processor 342 to operate as part of a SFW domain 362 associated with SFW instance 381 and different than SFW domain 360, as described above in relation to FIG. 1. In such examples, logical processors 332 and 342 may have different hardware designs, since they are booted by different SFW instances and booted to operate in different SFW domains. For example, compute logical processor 342 used to execute OS 115 and run applications in OS 115 may be a higher-performance (and possibly more expensive) logical processor than expansion logical processor 332, which will be unavailable to OS 115.

In the example of FIG. 3, logical processor 332 may execute instructions 324 to identify available memory 335 among memory 334 associated with logical processor 332, as described above in relation to FIG. 1. Logical processor 332 executing instructions 324 may also store a description 356 of the identified available memory 335 in service memory 252 of blade device 330 such that service processor 250 of blade device 330 may provide the description to the monarch logical processor for partition 308. In examples in which logical processor 342 is the monarch logical processor, service processor 250 may transfer the description 366 from service memory 252 to service memory 272 of blade device 340 via service processor 270. For example, service processor 250 may provide description 356 to service processor 270, which may store the received description 356 in service memory 272 where it is accessible to logical processor 342. In such examples, instructions 324 may identify available memory 335 to logical processor 342 by storing description 356 in service memory 252.

In the example of FIG. 3, logical processor 332 executing instructions 326 may access partition configuration information 354 for blade device 330 (e.g., in service memory 252, or in the system management memory region for SFW domain 360) and determine, based on information 354, that blade device 330 is an expansion blade device. In response to determining that blade device 330 is an expansion blade device, logical processor 332 may execute instructions 328 to hide identified available memory 335 from logical processor 332, as described above. Also in response to the determination that blade device 330 is an expansion blade device, logical processor 332 may execute instructions 329 to place logical processor 332 in a SFW execution mode (e.g., SMM), as described above in relation to FIG. 1. In the SFW execution mode, logical processor 332 may execute instructions of SFW instance 321 while OS 115 is executed by at least logical processor 342.

In the example of FIG. 3, instructions 384, executed by logical processor 342, may identify available memory 345 associated with logical processor 342, which may be at least a portion of memory 344 of blade device 340. In addition, logical processor 342 executing instructions 386 may access partition configuration information 374 for blade device 340 (e.g., in service memory 272 or in the system management memory region for SFW domain 362) and determine, based on information 374, that blade device 340 is a compute blade device.

In response to the determination that blade device 340 is a compute blade device, instructions 386, executed by logical processor 342, may determine not to enter the SFW execution mode with logical processor 342. In some examples, logical processor 342 may be the monarch logical processor. In such examples, logical processor 342 may execute instructions 388 to make available, for use by OS 115, logical processor 342, the identified memory of blade device 330 (e.g., memory 335), and the identified memory of blade device 340 (e.g., memory 345).

In some examples, instructions 388 may make these resources available for use by OS 115 by identifying the resources to OS 115. For example, instructions 388, executed by logical processor 342, may indicate, in at least one ACPI table 366, that logical processor 342, and identified memory 335 and 345 are available for use by OS 115. In such examples, the ACPI table(s) may each exclude any information regarding logical processor 332 such that logical processor 332 is not available for use by OS 115. Instructions 388 may store ACPI table(s) 366 in a memory region 365 of blade system 300 accessible to OS 115. Memory region 365 may be at least a portion of memory of blade device 340, or of another blade device of partition 308. OS 115 and any application(s) may then run on partition 308 utilizing the resources identified to OS 115 in ACPI table(s) 366. In some examples, functionalities described herein in relation to FIG. 3 may be provided in combination with functionalities described herein in relation to any of FIGS. 1-2 and 4-5.

FIG. 4 is a flowchart of an example method 400 for retaining a first logical processor in SMM during execution of an OS with a second logical processor. Although execution of method 400 is described below with reference to blade system 300 of FIG. 3, other suitable systems for execution of method 400 can be utilized (e.g., blade system 100 or 200). Additionally, implementation of method 400 is not limited to such examples.

At 405 of method 400, after a reset of at least partition 308, instructions 322, when executed by logical processor 332, may configure logical processor 332 to operate as part of SFW domain 360 associated with SFW instance 321. Also at 405, instructions 382, when executed by logical processor 342, may configure logical processor 342 to operate as part of SFW domain 362 associated with SFW instance 381. In some examples, SFW instance 381 may include instructions to boot partition 308 to execute OS 115.

At 410, instructions 324, when executed by logical processor 332, may identify available memory 335 of blade device 330 that is associated with logical processor 332. Also at 410, instructions 384, when executed by logical processor 342, may identify available memory 345 of blade device 340 that is associated with logical processor 342. At 415, instructions 388, when executed by logical processor 342, may make available, for use by OS 115, logical processor 342, the identified memory 335 of blade device 330, and the identified memory 345 of blade device 340, as described above.

At 420, instructions 329, when executed by logical processor 332, may place logical processor 332 in SMM prior to execution of OS 115 starting. Instructions 329 may cause logical processor 332 to enter SMM in response to a determination that blade device 330 is designated as an expansion blade device, as described above. At 425, partition 308 may start executing OS 115 with at least logical processor 342. For example, partition 308 may boot OS 115 with SFW instance 381, as described above, and then start execution of OS 115 with the resources of partition 308 made available to OS 115 by logical processor 342 (e.g., in APCI table(s) provided to OS 115, as described above). In such examples, partition 308 may execute OS 115 with at least logical processor 342 and identified memory 335 and 345, while logical processor 332 is unavailable to OS 115. In some examples, partition 308 may execute OS 115 with additional resources of partition 308. At 430, instructions 329, executed by logical processor 332, may retain logical processor 332 in SMM during execution of OS 115 with other logical processor(s) of partition 308, such as at least logical processor 342. In such examples, by keeping logical processor 332 in SMM, logical processor 332 may remain available to execute instructions of SFW instance 321 while it is unavailable to OS 115.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3 and 5.

FIG. 5 is a flowchart of an example method 500 for making available, for use by an OS of a partition, memory of first and second logical processors of the partition configured to operate in different SFW domains. Although execution of method 500 is described below with reference to blade system 300 of FIG. 3, other suitable systems for execution of method 500 can be utilized (e.g., blade system 100 or 200). Additionally, implementation of method 500 is not limited to such examples.

At 505 of method 500, after a reset of at least partition 308, instructions 322, when executed by logical processor 332, may configure logical processor 332 to operate as part of SFW domain 360 associated with SFW instance 321. Also at 405, instructions 382, when executed by logical processor 342, may configure logical processor 342 to operate as part of SFW domain 362, which is associated with SFW instance 381 and different than SFW domain 360. In some examples, SFW instance 381 may include instructions to boot partition 308 to execute OS 115.

At 510, instructions 326, when executed by logical processor 332, may determine that logical processor 332 is an expansion logical processor, based on partition information 354. Also at 510, instructions 386, when executed by logical processor 342, may determine that logical processor 342 is a compute logical processor, based on partition information 374.

At 515, instructions 324, when executed by logical processor 332, may identify available memory 335 of blade device 330 that is associated with logical processor 332. Also at 515, instructions 384, when executed by logical processor 342, may identify available memory 345 of blade device 340 that is associated with logical processor 342. At 520, instructions 324 may store a description 356 of identified memory 335 in service memory 252 of blade device 330 that is accessible to service processor 250 of blade device 330. At 525, service processor 250 may provide the description 356 to service processor 270 of blade device 340. At 530, service processor 270 may store description 356 in service memory 272 of blade device 340, where description 356 is accessible to logical processor 342.

At 535, instructions 388, when executed by logical processor 342, may make logical processor 342, the identified memory 335 of blade device 330, and the identified memory 345 of blade device 340 available for use by OS 115, as described above. At 540, instructions 329, when executed by logical processor 332, may place logical processor 332 in SMM prior to execution of OS 115 starting. Instructions 329 may cause logical processor 332 to enter SMM in response to a determination that blade device 330 is designated as an expansion blade device, as described above.

At 545, partition 308 may start executing OS 115 with at least logical processor 342. For example, partition 308 may boot OS 115 with SFW instance 381, as described above, and then start execution of OS 115 with the resources of partition 308 made available to OS 115 by logical processor 342 (e.g., in APCI table(s) provided to OS 115, as described above). In such examples, partition 308 may execute OS 115 with at least logical processor 342 and identified memory 335 and 345, while logical processor 332 is unavailable to OS 115. In some examples, partition 308 may execute OS 115 with additional resources of partition 308 as well. At 550, instructions 329, executed by logical processor 332, may retain logical processor 332 in SMM during execution of OS 115 with other logical processor(s) of partition 308, such as at least logical processor 342. In some examples, instructions 329 may retain logical processor 332 in SMM during execution of OS 115 in response to the determination that logical processor 332 is an expansion logical processor.

At 555, OS 115 executing on at least logical processor 342 may access identified memory 335 of blade device 330 during active operation of OS 115 (e.g., via node controllers 243 and 233, as described above). In such examples, OS 115 may access the identified memory 335 without entering SMM or otherwise suspending operation of OS 115 on any of the logical processors executing OS 115.

Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof. In some examples, functionalities described herein in relation to FIG. 5 may be provided in combination with functionalities described herein in relation to any of FIGS. 1-4.

What is claimed is:

1. A non-transitory machine-readable storage medium encoded with a system firmware (SFW) instance comprising instructions executable by a first logical processor of a first blade device of a blade system to:
   access partition configuration information for a partition of the blade system, the partition to execute an operating system (OS) and including the first blade device and a second blade device including a second logical processor, wherein the first and second logical processors are to operate as part of different SFW domains;
   identify, to the second blade device, available memory of the first blade device associated with the first logical processor, wherein the second blade device is to make the identified memory of the first blade device available for use by the OS; and
   in response to a determination that the partition configuration information indicates that the first blade device is an expansion blade device, place the first logical processor a SFW execution mode in which the first logical processor is to execute instructions of the SFW instance while the OS is executed by at least the second logical processor.

2. The storage medium of claim 1, wherein the instructions to place comprise instructions executable by the first logical processor to enter a system management mode (SMM) and remain in the SMM while the OS is executed by at least the second logical processor of the second blade device.

3. The storage medium of claim 1, wherein the instructions to place comprise instructions executable by the first logical processor to hide the identified memory of the first blade device from the first logical processor.

4. The storage medium of claim 1, wherein:
   the instructions to identify comprise instructions executable by the first logical processor to store a description of the identified memory in a service memory of the first blade device accessible to a service processor of the first blade device, wherein the service processor is to provide the description to the second blade device; and
   the instructions to access comprise instructions executable by the first logical processor to access the partition configuration information stored in the service memory.

5. The storage medium of claim 4, wherein the instructions to access further comprise instructions executable by the first logical processor to:
   access memory routing information for the partition stored in the service memory; and
   based on the memory routing information, configure the first blade device to route memory transactions, from the OS and targeting the identified memory of the first blade device, to the identified memory with a node controller of the first blade device.

6. The storage medium of claim 1, wherein the instructions to identify comprise instructions executable by the first blade device to:
   identify available memory of the first blade device associated with any one of a plurality of logical processors of the first blade device, the plurality of logical processors including the first logical processor; and
   provide to the second blade device a description of the identified memory of the first blade device;
   wherein the instructions to place comprise instructions executable by the first blade device to place each of the plurality of logical processors in the SFW execution mode in which each of the logical processors is to execute instructions of the SFW instance while the OS is executed by at least the second logical processor of the second blade device.

7. A system comprising:
   first firmware memory storing a first system firmware (SFW) instance;
   a first logical processor of a first blade device of a partition including the first blade device and a second blade device each mounted in a blade enclosure;
   second firmware memory storing a second SFW instance to boot the partition to execute an operating system (OS); and
   a second logical processor of the second blade device;
   wherein the first SFW instance comprises instructions executable by the first logical processor to:
      identify, to the second blade device, available memory of h first blade device associated with the first logical processor; and
      place the first logical processor in a SFW execution mode in which the first logical processor is to execute instructions of the first SFW instance while the OS is executed by at least the second logical processor; and
   wherein the second SFW instance comprises instructions executable by the second logical processor to make available, for use by the OS, the second logical processor and the identified memory of the first blade device.

8. The system of claim 7, wherein the first SFW instance comprises instructions executable by the first logical processor to hide the identified available memory of the first blade device from the first logical processor.

9. The system of claim 7, wherein the instructions of the first SFW instance to identify comprise instructions executable by the first logical processor to store a description of the identified memory in a first service memory of the first blade device accessible to a first service processor of the first blade device, wherein the first service processor is to transfer the description from the first service memory to a second service memory of the second blade device via a second service processor of the second blade device.

10. The system of claim 9, wherein:
   the first SFW instance comprises instructions executable by the first logical processor to determine, based an first partition configuration information, that the first logical processor is an expansion logical processor;
   the instructions to place comprise instructions executable by the first logical processor to place the first logical processor in the SFW execution mode in response to the determination that the first logical processor is an expansion logical processor; and
   the instructions of the second SFW instance comprise instructions executable by the second logical processor to:
      determine, based on second partition configuration information, that the second blade device is a compute blade device; and
      determine not to enter the SFW execution mode in response to the determination that the second blade device is a compute blade device.

11. The system of claim 10, wherein the instructions of the second SFW instance further comprise instructions executable by the second logical processor to:
   identify available memory of the second blade device associated with the second logical processor;

indicate, in at least one advanced configuration and power interface (ACPI table, that the compute logical processor and the identified memory of the first and second blade devices are available for use by the OS; and store the at least one ACPI table, each excluding any information regarding the first logical processor, in a memory region accessible to the OS.

12. The system of claim 7, wherein:

the first and second logical processors have different designs;

the first SFW instance comprises instructions executable by the first logical processor to configure the first logical processor to operate as part of a first SFW domain; and the second SFW instance comprises instructions executable by the second logical processor to configure the second logical processor to operate as part of a second SFW domain different than the first SFW domain.

13. A method executable by a partition of a blade system comprising first and second blade devices including first and second logical processors, respectively, the method comprising:

configuring the first logical processor to operate as part of a first system firmware (SFW) domain associated with a first SFW instance and the second logical processor to operate as part of a second SFW domain associated with a second SFW instance to boot the partition to execute an operating system (OS);

identifying, with the first and second logical processors, available memory of the first blade device associated with the first logical processor and available memory of the second blade device associated with the second logical processor;

making available, for use by the OS, the second logical processor and the identified memory of each of the first and second blade devices;

placing the first logical processor in a system management mode (SMM) prior to execution of the OS starting;

starting execution of the OS with at least the second logical processor, and retaining the first logical processor in the SMM during execution of the OS.

14. The method of claim 13, further comprising:

storing a description of the identified memory of the first blade device in a first service memory of the first blade device accessible to a first service processor of the first blade device;

providing the description from the first service processor to a second service processor of the second blade device; and storing the description in a second service memory the second blade device with the second service processor.

15. The method of claim 14, further comprising:

determining that the first logical processor is an expansion logical processor based on first partition configuration information, wherein the first logical processor is to place and retain the first logical processor in the SMM in response to the determination that the first logical processor is an expansion logical processor;

determining that the second logical processor is a compute logical processor based on second partition configuration information; and accessing, with the OS, the identified memory of the first blade device during active operation of the OS.

* * * * *